United States Patent
Shenk

(10) Patent No.: US 12,464,983 B2
(45) Date of Patent: Nov. 11, 2025

(54) AGRICULTURAL BALER WITH CONDITIONING ROTOR AND SHEAR BAR FOR FEEDING BALING CHAMBER

(71) Applicant: CNH Industrial America LLC, New Holland, PA (US)

(72) Inventor: Jonathan Shenk, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 735 days.

(21) Appl. No.: 17/854,948

(22) Filed: Jun. 30, 2022

(65) Prior Publication Data
US 2024/0000021 A1    Jan. 4, 2024

(51) Int. Cl.
| | |
|---|---|
| A01F 15/10 | (2006.01) |
| A01F 29/02 | (2006.01) |
| A01F 29/09 | (2010.01) |

(52) U.S. Cl.
CPC .............. *A01F 15/10* (2013.01); *A01F 29/02* (2013.01); *A01F 29/095* (2013.01); *A01F 2015/108* (2013.01)

(58) Field of Classification Search
CPC ...... A01F 15/10; A01F 15/106; A01F 15/005; A01F 29/02; A01F 29/10; A01F 29/095; A01F 2015/108; A01F 29/09; A01F 29/06; A01F 34/52
USPC .......................................................... 56/341
See application file for complete search history.

(56) References Cited

U.S. PATENT DOCUMENTS

| | | | | |
|---|---|---|---|---|
| 4,298,170 A | * | 11/1981 | Snavely ................ | A01F 29/095 241/242 |
| 5,052,170 A | * | 10/1991 | Trenkamp ............ | A01D 89/008 56/341 |
| 5,595,055 A | * | 1/1997 | Horchler, Jr. .......... | A01D 90/02 100/88 |
| 5,661,961 A | * | 9/1997 | Westhoff ............... | A01F 15/106 100/88 |

(Continued)

FOREIGN PATENT DOCUMENTS

| | | |
|---|---|---|
| DE | 24 45 702 C3 | 7/1980 |
| DE | 19651694 A1 * | 6/1998 ........... A01F 29/095 |

OTHER PUBLICATIONS

Extended European Search Report for EP Application No. 23182843.5 dated Nov. 23, 2023 (six pages).

*Primary Examiner* — Joseph M Rocca
*Assistant Examiner* — Sunny D Webb
(74) *Attorney, Agent, or Firm* — Buchanan Ingersoll & Rooney PC

(57) ABSTRACT

An agricultural baler includes: a chassis; a pickup carried by the chassis and including a plurality of rotatable tines configured to pick up crop material; a baling chamber carried by the chassis and configured to form a bale from crop material; and a feeding assembly carried by the chassis and configured to receive picked up crop material from the pickup and supply crop material to the baling chamber. The feeding assembly includes: a rotatable rotor carrying a plurality of projections configured to feed crop material to the baling chamber as the rotor rotates; and a shear bar disposed between the pickup and the rotor and configured to cooperate with the projections carried by the rotor to condition crop material before the crop material is fed to the baling chamber by the projections.

18 Claims, 3 Drawing Sheets

(56) References Cited

U.S. PATENT DOCUMENTS

| | | |
|---|---|---|
| 6,394,893 B1 * | 5/2002 | Scholz .................. A01D 90/04 460/6 |
| 6,763,761 B1 | 7/2004 | Smith |
| 6,874,311 B2 * | 4/2005 | Lucand ................ A01F 15/106 56/364 |
| 6,910,325 B2 | 6/2005 | Viaud |
| 8,205,424 B1 | 6/2012 | Lang et al. |
| 11,160,213 B2 | 11/2021 | Kraus |
| 11,576,303 B2 * | 2/2023 | Essig .................... A01D 43/08 |
| 2020/0396898 A1 | 12/2020 | Essig et al. |

* cited by examiner

AGRICULTURAL BALER WITH CONDITIONING ROTOR AND SHEAR BAR FOR FEEDING BALING CHAMBER

BACKGROUND OF THE INVENTION

The present invention pertains to agricultural vehicles and, more specifically, to agricultural balers.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A baler may generally include a chassis, supported by wheels, a pickup unit to engage and lift the crop material into the baler, a cutting unit, a main baling chamber for forming a bale, and a wrapping mechanism for wrapping or tying a material around the bale after it has been formed in the main baling chamber. Many known balers utilize fingers that pull crop across stationary knives located in the drop floor to chop the crop material. While such configurations are effective, the power requirements to chop the crop material can be high and requires robust driveline components that increase the cost of the baler.

What is needed in the art is a way to condition crop material entering the baler in a way that addresses some of the issues with known balers.

SUMMARY OF THE INVENTION

Exemplary embodiments provided according to the present disclosure include a feeding assembly that feeds crop to a baling chamber and has a rotatable rotor with projections that cooperate with a shear bar to condition crop material before feeding crop material to the baling chamber.

In some exemplary embodiments provided in accordance with the present disclosure, an agricultural baler includes: a chassis; a pickup carried by the chassis and including a plurality of rotatable tines configured to pick up crop material; a baling chamber carried by the chassis and configured to form a bale from crop material; and a feeding assembly carried by the chassis and configured to receive picked up crop material from the pickup and supply crop material to the baling chamber. The feeding assembly includes: a rotatable rotor carrying a plurality of projections configured to feed crop material to the baling chamber as the rotor rotates; and a shear bar disposed between the pickup and the rotor and configured to cooperate with the projections carried by the rotor to condition crop material before the crop material is fed to the baling chamber by the projections.

In some exemplary embodiments provided in accordance with the present disclosure, a method of feeding crop material to a baling chamber of an agricultural baler that is configured to form a bale from fed crop material is provided. The method includes: picking up crop material with a plurality of tines of a rotating pickup; and feeding the crop material to the baling chamber with a feeding assembly including a rotating rotor carrying a plurality of projections that feed the crop material to the baling chamber and a shear bar disposed between the pickup and the rotor such that the shear bar cooperates with the projections carried by the rotor to condition crop material before the crop material is fed to the baling chamber by the projections.

One possible advantage that may be realized by exemplary embodiments provided according to the present disclosure is that the feeding assembly can operate at a higher rotational speed with more rotational inertia than known assemblies to provide smoother feeding to the baling chamber.

Another possible advantage that may be realized by exemplary embodiments provided according to the present disclosure is that the shear bar can be moved to different positions to control the chop quality of crop material or, in some embodiments, allow crop material to pass by the shear bar without chopping.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 2A illustrates a detailed view of FIG. 2 showing interaction between the shear bar, tines of the pickup and the rotor projections.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
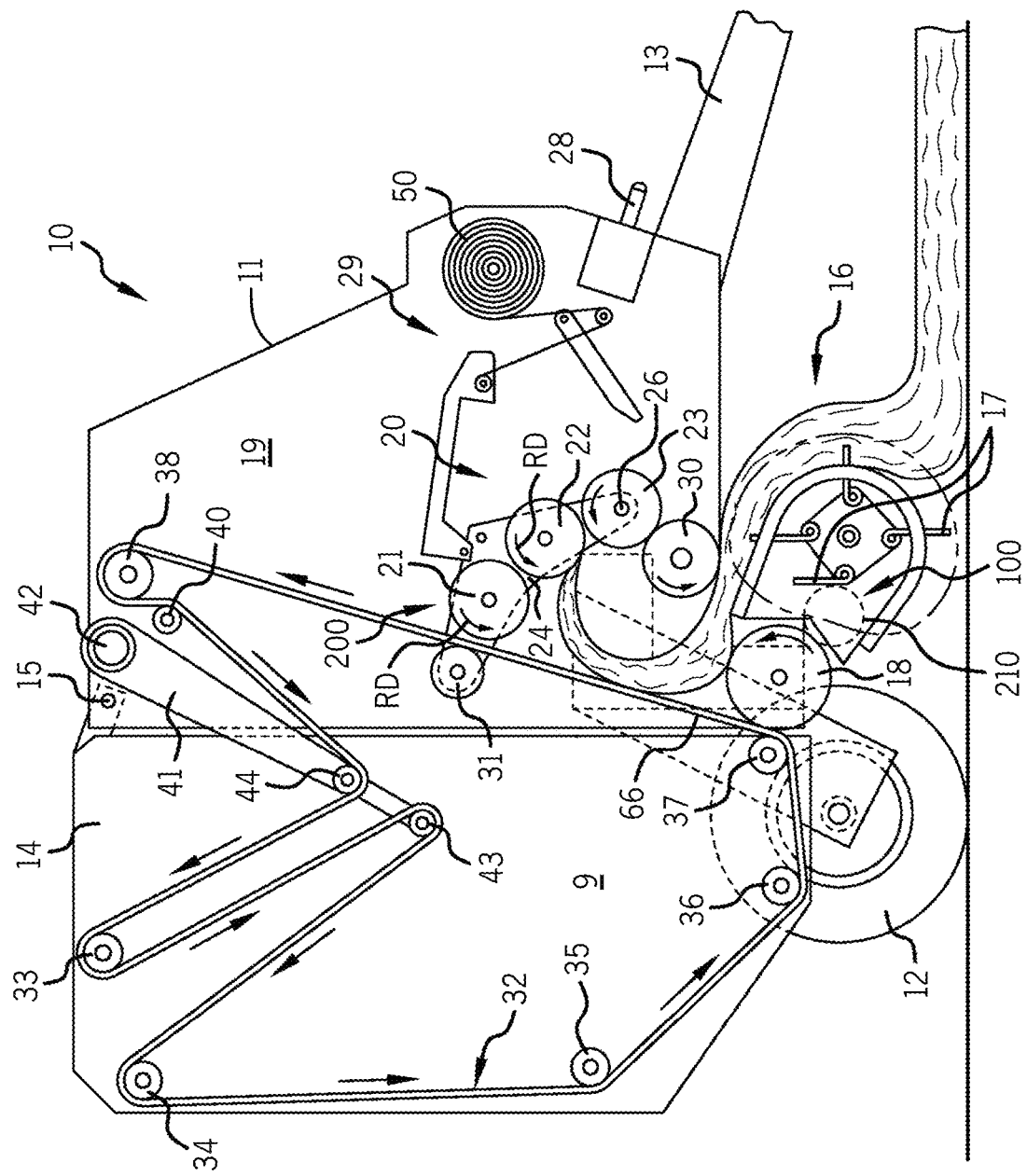
FIG. 1 illustrates a side sectional view of an exemplary embodiment of an agricultural baler including a feeding assembly, provided in accordance with the present disclosure.

Referring now to the drawings, and more particularly to FIG. 1, an exemplary embodiment of an agricultural baler 10 is illustrated in the form of a round baler having an expandable chamber defined in part by belts and rolls, as disclosed in U.S. Pat. No. 4,870,812, which is incorporated herein by reference. Baler 10 has a chassis 11, carrying a pair of side walls 19 (only one side wall is shown), supported by a pair of wheels 12 (only one wheel 12 shown). As used herein, a rotary or round baler 10 is a baler that produces a substantially cylindrical bale having a substantially round or circular cross section. It should be appreciated that while the baler 10 is illustrated and described herein as being configured as a round baler to form round bales, in some embodiments the baler 10 is configured to form bales having other shapes, e.g., large or small squares. A forwardly mounted tongue 13 is provided on chassis 11 for connection to a tractor. Pivotally connected to a side wall 19 by a pair of stub shafts 15 is a tailgate 14 which is closed during bale formation. A feeding assembly 100 includes a pickup 16, carried by chassis 11, that rotates tines 17 movable in a predetermined path to lift crop material from the ground.

An expandable baling chamber 9 configured to form bales from crop material is defined partly by a sledge assembly 20 including transversely extending bale-forming rolls 21, 22, 23 journalled at their ends in a pair of spaced arms 24, one of which is shown. These arms 24 are pivotally mounted on stub shafts 26 for providing movement of sledge assembly 20. Rolls 21, 22, 23 are driven in a rotation direction by, for example, chains and sprockets coupled to a drive shaft 28. The drive shaft 28 may be, for example, a power take-off. A starter roll 30, mounted on chassis 11, is also driven counter-clockwise. A freely rotatable idler roll 31, carried by arms 24, moves in an arcuate path with sledge assembly 20.

A wrapping mechanism 29 is mounted between side walls 19 on chassis 11 and sledge assembly 20 forwardly of the baling chamber 9. Wrapping material, such as a polymer sheet, net, twine, etc., is dispensed from a supply 50 of wrapping material, which may be a roll of wrapping material, to the chamber 9 via an opening between rolls 22 and 23.

The baling chamber 9 is further defined by an apron 32 comprising a plurality of continuous side-by-side belts supported by guide rolls 33, 34, 35, 36, 37 rotatably mounted in tailgate 14. Apron 32 is also supported by drive roll 38, mounted on chassis 11. Although apron 32 passes between roll 21 and idler roll 31, it is in engagement only with idler roll 31 and not roll 21. A suitable coupler connected to drive shaft 28 provides rotation of drive roll 38, causing movement of apron 32 in the directions indicated by the arrows in FIG. 1. An additional guide roll 40 ensures proper engagement between apron 32 and drive roll 38. A pair of take-up arms 41 (only one shown) is pivotally mounted on chassis 11 by a cross shaft 42 for movement between inner, intermediate and outer positions. Take-up arms 41, which carry additional guide rolls 43, 44 for supporting apron 32, are resiliently urged toward their inner positions.

When the elements of round baler 10 are disposed as shown in FIG. 1, an inner course 66 of apron 32 extends between guide roll 37 and idler roll 31 to form the rear wall of the core starting chamber 9, while the inwardly facing surfaces of rolls 21, 22, 23 define, in a general manner, a rearwardly inclined front wall. A floor roll 18 defines the bottom of the chamber 9, and with starter roll 30, provides an inlet for crop material.

When baler 10 travels across a field, the feeding assembly 100 picks up crop material from the ground and conveys it further into the baler 10. The crop material is conveyed by floor roll 18 into engagement with apron inner course 66 which urges the crop material upward and forward into engagement with the rolls on sledge assembly 20. In this manner, crop material is coiled in a clockwise direction to start a bale core. Continued feeding of crop material into the baling chamber 9 by the feeding assembly 100 causes apron inner course 66 to expand in length around a portion of the circumference of the bale core as the diameter increases. Take-up arms 41 rotate from their inner position toward their outer position to accommodate expansion of the inner course 66 of the apron in a well-known manner. After a bale has been formed and wrapped, tailgate 14 is opened and the bale is ejected rearwardly.

During bale formation, sledge assembly 20 moves between a bale-starting position to a full bale position. This movement causes idler roll 31 to move in an arcuate path while maintaining apron 32 in close proximity to roll 21, thereby allowing roll 21 to strip crop material from the belts and prevent or reduce significantly the loss of crop material between roll 21 and apron 32 during bale formation. Sledge assembly 20 is pushed outward towards its full bale position during bale formation as the crop material expands against rolls 21, 22, 23 and then subsequently is pulled inward by apron 32.

In known balers, the feeding assembly generally includes a chopper to chop the picked up crop material into desired lengths. The chopper generally rotates at low rotational speeds of no more than 120 rotations per minute. Such choppers have high power requirements and can also be prone to plugging.

Figure 2:
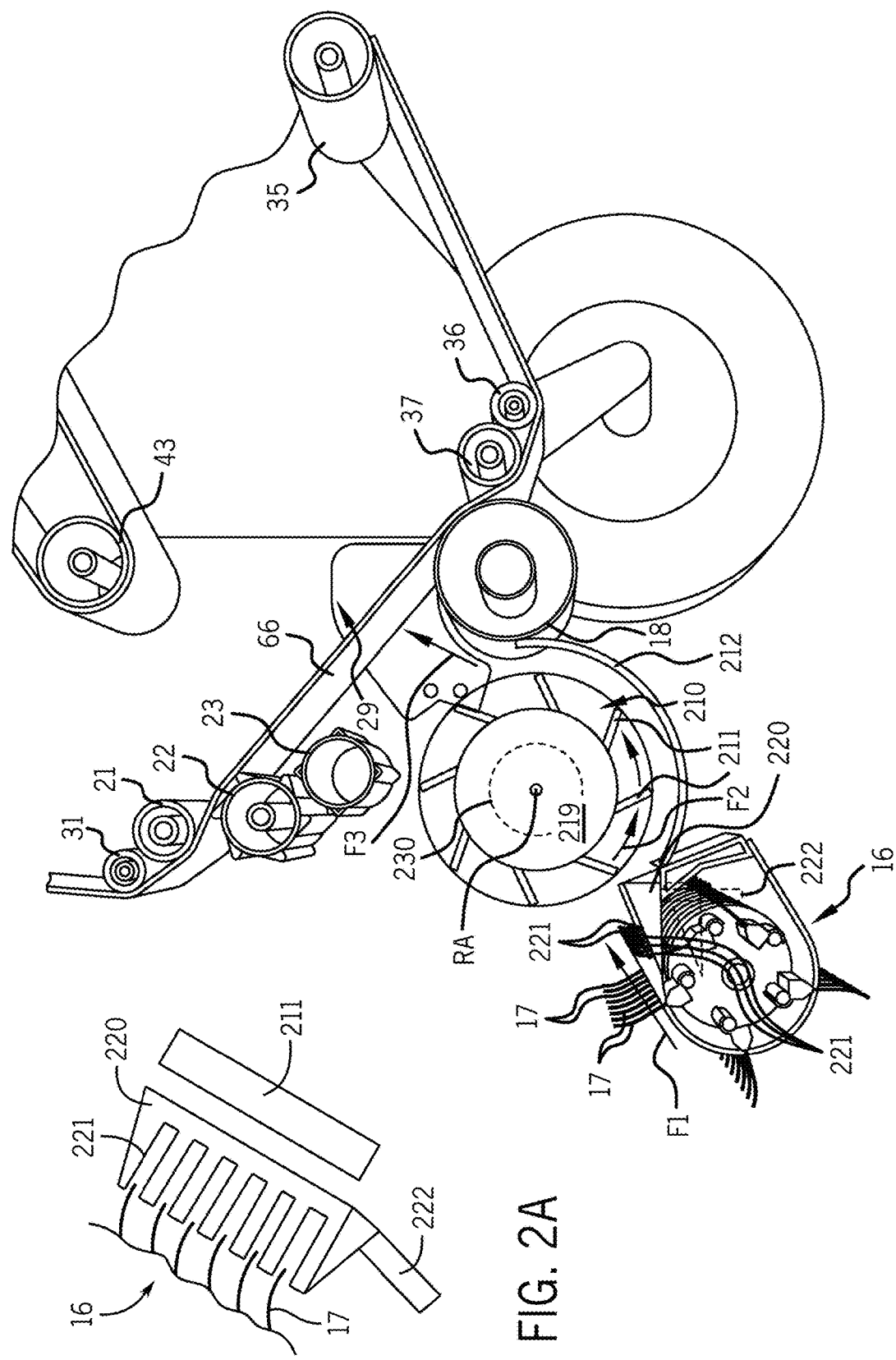
FIG. 2 illustrates a side sectional view of the agricultural baler of FIG. 1 showing the feeding assembly of FIG. 1 in greater detail.

To address some of the previously described issues with known balers, and referring now to FIG. 2 as well, the feeding assembly 100 provided according to the present disclosure includes a rotatable rotor 210 that carries a plurality of projections 211 configured to feed crop material to the baling chamber 9 as the rotor 210 rotates and a shear bar 220 disposed between the pickup 16 and the rotor 210. The shear bar 220 is configured to cooperate with the projections 211 carried by the rotor 210 to condition crop material before the crop material is fed to the baling chamber 9 by the projections 211. In this regard, crop material may be picked up from the ground by the tines 17 carried by the pickup 16, with the tines 17 then moving the picked up crop material towards the rotor 210, as indicated by a first flow direction F1. As the crop material flows towards the rotor 210, one or more of the projections 211 contacts the crop material and begins moving it in a second flow direction F2. As the projection(s) 211 move the crop material in the second flow direction F2, the projection(s) 211 and the shear bar 220 condition the crop material before the projection(s) 211 moves the crop material across a curved surface 212 and feeds the crop material in a third flow direction F3 to the floor roll 18 defining the inlet of the baling chamber 9.

As used herein, the shear bar 220 is configured to cooperate with the projections 211 to "condition" the crop material in the sense that the shear bar 220 and projections 211 together tend to change a physical characteristic of the crop material as the rotor 210 rotates so the projections 211 feed the crop material to the baling chamber 9. For example, at least one of the projections 211 may be a knife having a sharpened edge. When provided as a knife, the projection(s) 211 may cooperate with the shear bar 220 to chop crop material into smaller pieces, as is known. Alternatively, one or more of the projections 211 may be provided in the form of a flexible flail that is flexibly coupled, e.g., hinged, to the rotor 210 and cooperates with the shear bar 220 in a manner that tends to beat or shred the crop material. The projections 211 and the shear bar 220 thus can act together to physically alter the crop material before the crop material is fed to the baling chamber 9. Many types of possible projections may be provided according to the present disclosure and it should be appreciated that the projections 211 being in the form of one or more knives and/or flails is exemplary only.

The rotor 210 may be configured to rotate about an axis of rotation RA. As the rotor 210 rotates about the axis of rotation RA, the rotor 210 carries the projections 211 about the axis of rotation RA as well. In some embodiments, the projections 211 extend in parallel with the axis of rotation RA, i.e., with a longest dimension extending parallel to the axis of rotation RA axially across the rotor 210. In some embodiments, each projection 211 extends in parallel with the axis of rotation RA from one end face 213 of the rotor 210 to the opposite end face. It should be appreciated that, in some embodiments, there may be multiple projections 211 coaxially extending in parallel to the axis of rotation RA.

In some embodiments, at least one of the projections 211, whether in the form of one or more knives and/or flails, is removable from the rotor 210. As used herein, the projection 211 is "removable from" the rotor 210 in the sense that the projection 211 may be removed from the rotor 210 without damaging the projection 211 or the rotor 210 so the rotor 210 no longer carries the removed projection. One or more of the projections 211 may, for example, be fastened to the rotor 210 using one or more appropriate fasteners, such as a bolt. To remove the projection 211 from the rotor 210, the fastener may be loosened and the projection 211 removed from the rotor 210. The removed projection may then be replaced with a similar projection, e.g., a knife replaced with a knife, if the removed projection is, for example, damaged and needs to be replaced. Alternatively, the removed projection may be replaced with a different type of projection, e.g., a knife replaced with a flail, to change the conditioning characteristics of the crop material, e.g., replacing knives with flails so the crop material is not chopped prior to entering the baling chamber 9.

As illustrated in FIG. 2 and FIG. 2A, the shear bar 220 may be placed in a position where there is overlap between the shear bar 220 and the tines 17. To prevent damage to the tines 17, the shear bar 220 may have a plurality of tine slots 221 formed therein that allow the tines 17 to pass through the shear bar 220 during rotation. The tine slots 221 may, for example, each have a width that is slightly larger than the width of each tine 17 and be aligned with a movement path of the tines 17 so the tines 17 do not strike the shear bar 220.

In some embodiments, the shear bar 220 is a moveable shear bar 220 that can be moved to a variety of different positions. For example, the shear bar 220 may be coupled to a bar actuator 222 that is configured to extend and retract to move the shear bar 220. By moving the shear bar 220 with the bar actuator 222, the cooperation between the projections 211 and the shear bar 220 can be adjusted to change the conditioning of the crop material. In some embodiments, the shear bar 220 is configured to move to a non-conditioning position, illustrated in dashed lines, where the shear bar 220 does not cooperate with the projections 211 to condition crop material. In the non-conditioning position, the shear bar 220 is oriented such that crop material moved by the projections 211 is not forced against the shear bar 220 in a manner that conditions the crop material. In some embodiments, the shear bar 220 is removable, e.g., held in place by removable fasteners, so the shear bar 220 can be entirely removed from the feeding assembly 100 rather than being moved by the bar actuator 222. Thus, crop material may be fed to the baling chamber 9 by the projections 211 without being conditioned, e.g., chopped, beaten, or shredded, prior to being fed to the baling chamber 9.

The rotor 210 may be coupled to a rotor driver 230 that is configured to rotate the rotor 210 at one or more rotational speeds. The rotor driver 230 may be, for example, coupled to and/or powered by the drive shaft 28 in order to rotate the rotor 210. The rotor driver 230 may be, for example, a drive coupling that diverts power from the drive shaft 28 to rotate the rotor 210. The rotor driver 230 may include a gearbox so the rotor 210 can be rotated at a variety of rotational speeds. In some embodiments, the rotor driver 230 is configured to rotate the rotor 210 at a rotation speed of at greater than 120 rotations per minute (rpm), such as at least 200 rpm. The rotor driver 230 may be configured to rotate the rotor 210 at even greater rotational speeds, such as at least 250 rpm or 300 rpm. By rotating the rotor 210 at relatively high speeds compared to known baler choppers, the rotor 210 can benefit from rotational inertia to smooth crop material feeding to the baling chamber 9 while also increasing the chop quality of crop material, reduce the risk of plugging, increase capacity, and simplify the construction of the drop floor.

Figure 3:
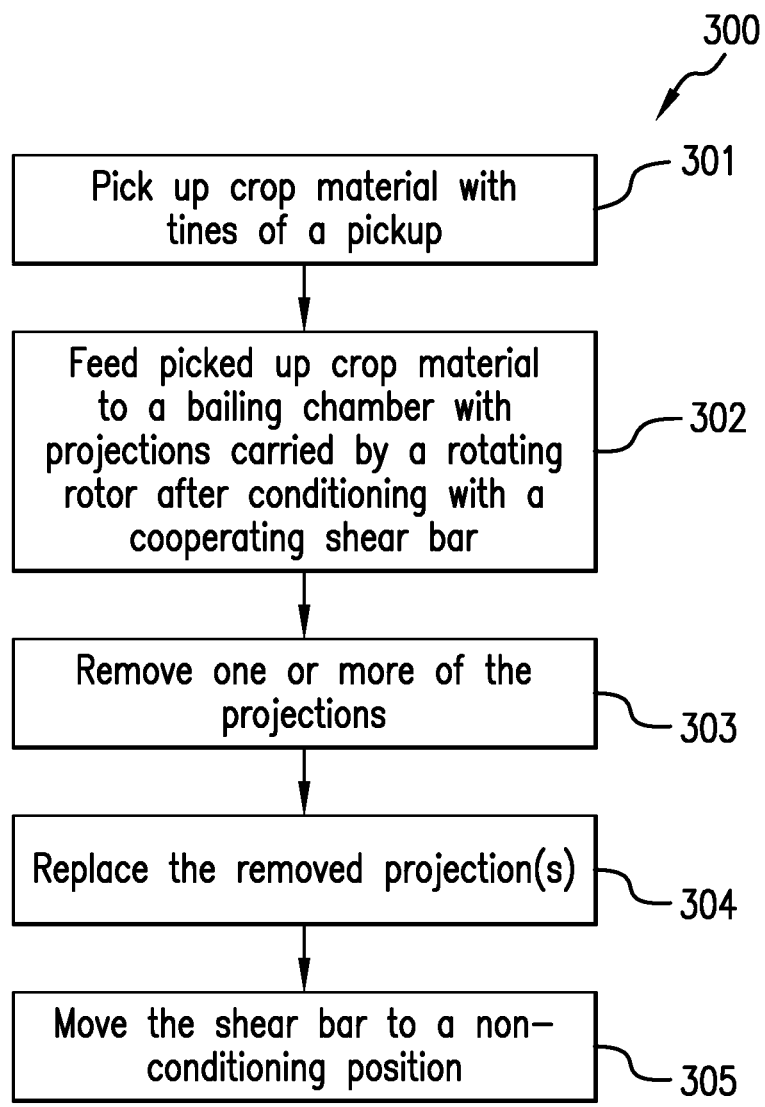
FIG. 3 is a flow chart illustrating an exemplary embodiment of a method of feeding crop material to a baling chamber of an agricultural baler, provided in accordance with the present disclosure.

Referring now to FIG. 3, a method 300 of feeding crop material to the baling chamber 9 of the agricultural baler 10 is also provided. The method 300 includes picking up 301 crop material with the tines 17 of the rotating pickup 16 and feeding 302 the crop material to the baling chamber 9 with the feeding assembly 100 including the rotating rotor 210 carrying the projections 211 that feed the crop material to the baling chamber 9 and the shear bar 220 disposed between the pickup 16 and the rotor 210 such that the shear bar 220 cooperates with the projections 211 carried by the rotor 210 to condition crop material before the crop material is fed to the baling chamber 9 by the projections 211. The method 300 may further include removing 303 one or more of the projections 211, which may be a knife and/or a flexible flail, and, replacing 304 the removed projection with another projection, which may be the same kind of projection or a different kind of projection. The method 300 may also include moving 305 the shear bar 220 to a non-conditioning position where the shear bar 220 does not cooperate with the projections 211 to condition crop material. The rotor 210 may be rotated at a variety of rotational speeds, including but not limited to greater than 120 rpm, such as at least 200 rpm.

From the foregoing, it should be appreciated that the baler 10 provided according to the present disclosure includes a feeding assembly 100 with a rotor 210 carrying projections 211 and a shear bar 220 that cooperates with the projections 211 to condition crop material before the crop material is fed to the baling chamber 9 for baling. By utilizing the combination of the rotor 210/projections 211 and shear bar 220, the conditioning of the crop material can be well-controlled, e.g., by moving the shear bar 220 to change the chop quality. The rotor 210, and carried projections 211, may also rotate at relatively high speeds to benefit from rotational inertia and reduce spike loads in the driveline, as well as reduce the risk of plugging and increase capacity. Thus, the feeding assembly 100 provided according to the present disclosure can improve the feeding of crop material to the baling chamber 9.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:
1. An agricultural baler, comprising:
a chassis;
a pickup carried by the chassis and comprising a plurality of rotatable tines configured to pick up crop material;
a baling chamber carried by the chassis and configured to form a bale from crop material; and
a feeding assembly carried by the chassis and configured to receive picked up crop material from the pickup and supply crop material to the baling chamber, the feeding assembly comprising:

a rotatable rotor carrying a plurality of projections configured to feed crop material to the baling chamber as the rotor rotates;

a shear bar disposed between the pickup and the rotor and configured to cooperate with the projections carried by the rotor to condition crop material before the crop material is fed to the baling chamber by the projections; and an actuator for moving the shear bar between (i) a conditioning position where the shear bar cooperates with the projections to condition crop material and (ii) a non-conditioning position where the shear bar does not cooperate with the projections to condition crop material.

2. The agricultural baler of claim 1, wherein the rotor is configured to rotate about an axis of rotation and the projections extend in parallel with the axis of rotation.

3. The agricultural baler of claim 1, wherein the projections comprise at least one knife comprising a sharpened edge.

4. The agricultural baler of claim 3, wherein the at least one knife is removable from the rotor.

5. The agricultural baler of claim 1, wherein the projections comprise at least one flexible flail.

6. The agricultural baler of claim 5, wherein the at least one flexible flail is removable from the rotor.

7. An agricultural baler, comprising:
a chassis;
a pickup carried by the chassis and comprising a plurality of rotatable tines configured to pick up crop material;
a baling chamber carried by the chassis and configured to form a bale from crop material; and
a feeding assembly carried by the chassis and configured to receive picked up crop material from the pickup and supply crop material to the baling chamber, the feeding assembly comprising:
a rotatable rotor carrying a plurality of projections configured to feed crop material to the baling chamber as the rotor rotates; and
a shear bar disposed between the pickup and the rotor and configured to cooperate with the projections carried by the rotor to condition crop material before the crop material is fed to the baling chamber by the projections, wherein the shear bar comprises a plurality of tine slots that allow the tines to pass through the shear bar during rotation.

8. The agricultural baler of claim 1, further comprising a rotor driver coupled to the rotor and configured to rotate the rotor at a rotation speed of greater than 120 rotations per minute.

9. The agricultural baler of claim 8, wherein the rotor driver is configured to rotate the rotor at a rotation speed of at least 200 rotations per minute.

10. The agricultural baler of claim 1, wherein the baling chamber comprises a roll assembly configured to form round bales from crop material.

11. A method of feeding crop material to a baling chamber of an agricultural baler that is configured to form a bale from fed crop material, the method comprising:
picking up crop material with a plurality of tines of a rotating pickup;
feeding the crop material to the baling chamber with a feeding assembly comprising a rotating rotor carrying a plurality of projections that feed the crop material to the baling chamber and a shear bar disposed between the pickup and the rotor such that the shear bar cooperates with the projections carried by the rotor to condition crop material before the crop material is fed to the baling chamber by the projections; and
activating an actuator to move the shear bar from (i) a conditioning position where the shear bar cooperates with the projections to condition crop material to (ii) a non-conditioning position where the shear bar does not cooperate with the projections to condition crop material.

12. The method of claim 11, wherein the rotor rotates about an axis of rotation and the projections extend in parallel with the axis of rotation.

13. The method of claim 11, wherein the projections comprise at least one knife comprising a sharpened edge.

14. The method of claim 13, further comprising removing the at least one knife from the rotor.

15. The method of claim 11, wherein the projections comprise at least one flexible flail.

16. The method of claim 15, further comprising removing the at least one flexible flail from the rotor.

17. The method of claim 11, wherein the shear bar comprises a plurality of tine slots that allow the tines to pass through the shear bar during rotation.

18. The method of claim 11, wherein a rotor driver is coupled to the rotor and rotates the rotor at a rotation speed of at least 200 rotations per minute.

* * * * *